(12) United States Patent
Colombatto

(10) Patent No.: US 8,215,128 B2
(45) Date of Patent: Jul. 10, 2012

(54) SHEARING BLADE FOR MOLTEN GLASS GOBS

(75) Inventor: Alessandro Colombatto, Val della Torre (IT)

(73) Assignee: Turmond S.p.A., Val della Torre (Torino) (IT)

( * ) Notice: Subject to any disclaimer, the term of this patent is extended or adjusted under 35 U.S.C. 154(b) by 308 days.

(21) Appl. No.: 12/612,975

(22) Filed: Nov. 5, 2009

(65) Prior Publication Data

US 2010/0107698 A1    May 6, 2010

(30) Foreign Application Priority Data

Nov. 6, 2008  (EP) .................................... 08425711

(51) Int. Cl.
*C03B 7/10*    (2006.01)
*C03B 7/11*    (2006.01)
(52) U.S. Cl. .......................................... 65/334; 65/133
(58) Field of Classification Search .............. 65/87, 133, 65/105, 112, 174, 123, 303, 334, 332; 83/196–200, 83/202–283, 350–357, 401, 600–730, 746, 83/786, 838, 513–519
See application file for complete search history.

(56) References Cited

U.S. PATENT DOCUMENTS

| | | | | |
|---|---|---|---|---|
| 1,760,435 | A * | 5/1930 | Peiler | 65/158 |
| 2,053,039 | A * | 9/1936 | McSwain | 83/174 |
| 3,160,493 | A * | 12/1964 | Kuppers | 65/133 |
| 3,490,326 | A * | 1/1970 | McNamara | 83/600 |
| 3,817,133 | A * | 6/1974 | Romberg | 83/171 |
| 3,962,939 | A * | 6/1976 | Stengle, Jr. | 83/51 |
| 4,036,094 | A * | 7/1977 | Schaar | 83/623 |
| 5,711,777 | A * | 1/1998 | Nickey et al. | 65/26 |
| 6,047,567 | A * | 4/2000 | Flynn | 65/334 |
| 6,634,188 | B1 * | 10/2003 | Gruber et al. | 65/334 |
| 6,868,698 | B2 * | 3/2005 | Gruber et al. | 65/334 |

FOREIGN PATENT DOCUMENTS

EP    1052229 A2 * 11/2000

* cited by examiner

*Primary Examiner* — Matthew Daniels
*Assistant Examiner* — Jodi C Franklin
(74) *Attorney, Agent, or Firm* — Nixon & Vanderhye P.C.

(57) ABSTRACT

Shearing blade for molten glass gobs comprising a knife (1) made of hard metal having a substantially V-shaped front shearing portion (5) with a shearing edge (7) whose width is in the range between 8 and 11% of the distance between the ends (6) of the V-shaped shearing portion (5). Between the shearing edge (7) and the rear support portion (2) of the knife, the upper surface of the knife (1) has a lowered surface (8).

17 Claims, 3 Drawing Sheets

SHEARING BLADE FOR MOLTEN GLASS GOBS

This application claims priority to European Application No. 08425711.2, filed 6 Nov. 2008, the entire contents of which is hereby incorporated by reference.

FIELD OF THE INVENTION

The present invention generally refers to the glass production process, and more in particular it regards a shearing blade for molten glass gobs.

All plants for producing glass bottles, vases, containers and the like, use shearing blades thus made during the production process. The molten glass that exits as a continuous flow from the furnaces at about 1000° C. is channelled and conveyed towards shearing stations whereat created are the gobs which, after being sheared by the shearing blades, are blown in the moulds generating the containers.

Blades thus made typically consist in a generally flat metal knife having an upper surface and a lower surface, a rear support portion and a front substantially V-shaped shearing portion with a shearing edge.

These blades are used as opposite pairs with the respective support portions fixed to holding elements moveable between a mutually spaced position and a mutually closed position in which the shearing portions of the two blades partially overlap the molten glass gob from opposite sides to perform the shearing thereof.

PRIOR ART

The shearing blades in question, examples of which are diclosed in U.S. Pat. No. 6,047,567 and U.S. Pat. No. 4,036,094, are usually made of steel and their duration—taking into account both the high temperatures of molten glass and the abrasive action imparted by the latter during the shearing—is relatively short. As a matter of fact, the blades are subjected to considerable deformations, which leads to an extremely quick deterioration thereof and reduces their shearing quality in a substantial manner, hence generating a relatively large amount of by-products. The average duration of conventional steel blades amounts to about 1-2 weeks, depending on the production rate, after which they require complete replacement. The replacement of the blades has considerable negative effects on the production costs, in that the flow of molten glass cannot be interrupted and all the glass produced during the blades replacement operations must be discarded. The average production of the current gob-shearing machines amounts to about 180 gobs per minute, thus explaining the extremely large number of bottles or analogous glass containers lost during the blades replacement operations which usually require about 2-3 hours.

In the attempt to solve this problem it was proposed in the European patent EP-1052229B1 to provide the blade with a hard metal having a well defined thermal conductivity, with a shearing edge terminating at a given distance from the end of the V-shaped shearing portion of the knife.

Not even this arrangement is free of drawbacks, in particular—regarding the operation—the sliding friction between the blade and the homologous blade when shearing the glass gob, especially at the zone located immediately at the rear part of the shearing edge, hence leading to an early wear regardless of the use of hard metal.

SUMMARY OF THE INVENTION

The object of the present invention is that of providing a shearing blade for molten glass gobs, of the type defined in the introduction, having a remarkably extended operation duration in such a manner to considerably contribute to the reduction of by-products and thus the production costs regarding glass manufactured products, and simultaneously capable of improving the shearing quality and accuracy.

In order to attain such object, the invention has the object of providing a shearing blade for molten glass gobs of the type defined above, essentially characterised in that the abovementioned shearing edge has a width in the range between 8 and 11% of the distance between the ends of the aforementioned V-shaped shearing portion, and in that between the V-shaped shearing portion and the support portion the upper surface of the knife has a lowered surface.

Due to this arrangement, when using the blade, the sliding surface with respect to the homologous blade is provided for a long a substantial surface (having an extension, with the current dimensions of the blades, in the range between about 7 and 8 mm.), followed by the abovementioned lowered surface (typically in the order of about 0.15 mm.) which facilitates the mutual sliding of the blades.

BRIEF DESCRIPTION OF THE DRAWINGS

Now, the invention shall be described in detail with reference to the attached drawings, strictly provided for exemplifying and non-limiting purposes, wherein.

DETAILED DESCRIPTION OF THE INVENTION

Figure 1:
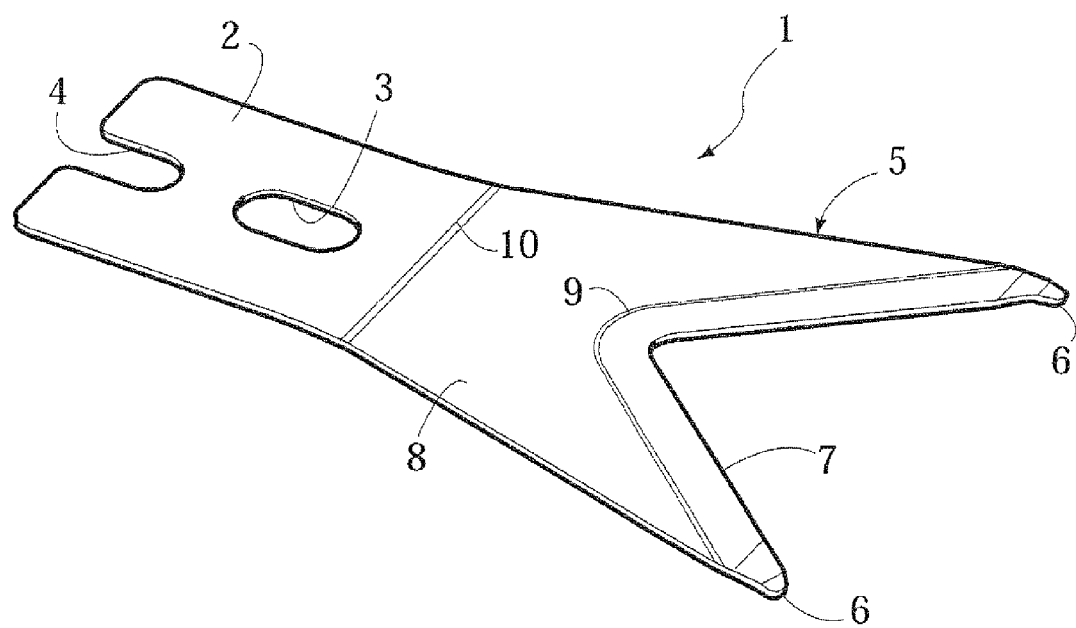
FIG. 1 is a top perspective view of a shearing blade for molten glass gobs according to the invention.
Figure 2:
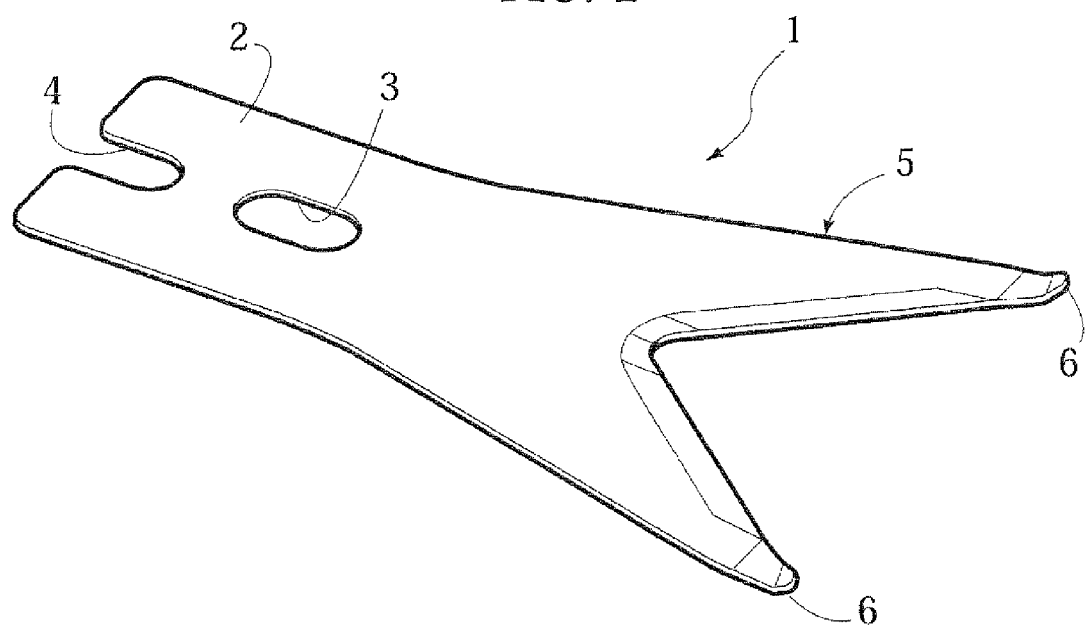
FIG. 2 is a bottom perspective view of the blade.

Referring to the drawings, an example of embodiment of the blade, according to the invention, for shearing molten glass gobs comprises a generally flat knife 1 made of hard metal, typically with a cobalt percentage exceeding 10 and a fine average granulometry, for example in the range between 0.6 and 0.9 microns.

The knife 1, whose thickness may be in the order of about 2 mm and whose length may for example be in the range between 130 and 150 mm., has a rear support portion 2 made with a slot 3 and an end cavity 4 for joining the blade to the shearing machine, and a front shearing portion 5. Such shearing portion 5 is generally V-shaped with its branches forming an angle with respect to each other, indicated with A in FIG. 3, of about 80° and they terminate with ends 6 slightly bent downwards, i.e. from the upper surface towards the lower surface of the knife 1. The ends 6 may for example be curved with a radius of curvature equivalent to R12.

The front edge of the V-shaped shearing portion 5 has a shearing surface 7 which extends—on the upper surface of the knife 1—up to the ends 6 and which, according to a distinctive aspect of the invention, has a substantial width, remarkably greater than the one of the currently known knives. Such width is conveniently in the range between 8 and 11% of the distance between the ends 6.

Figure 3:
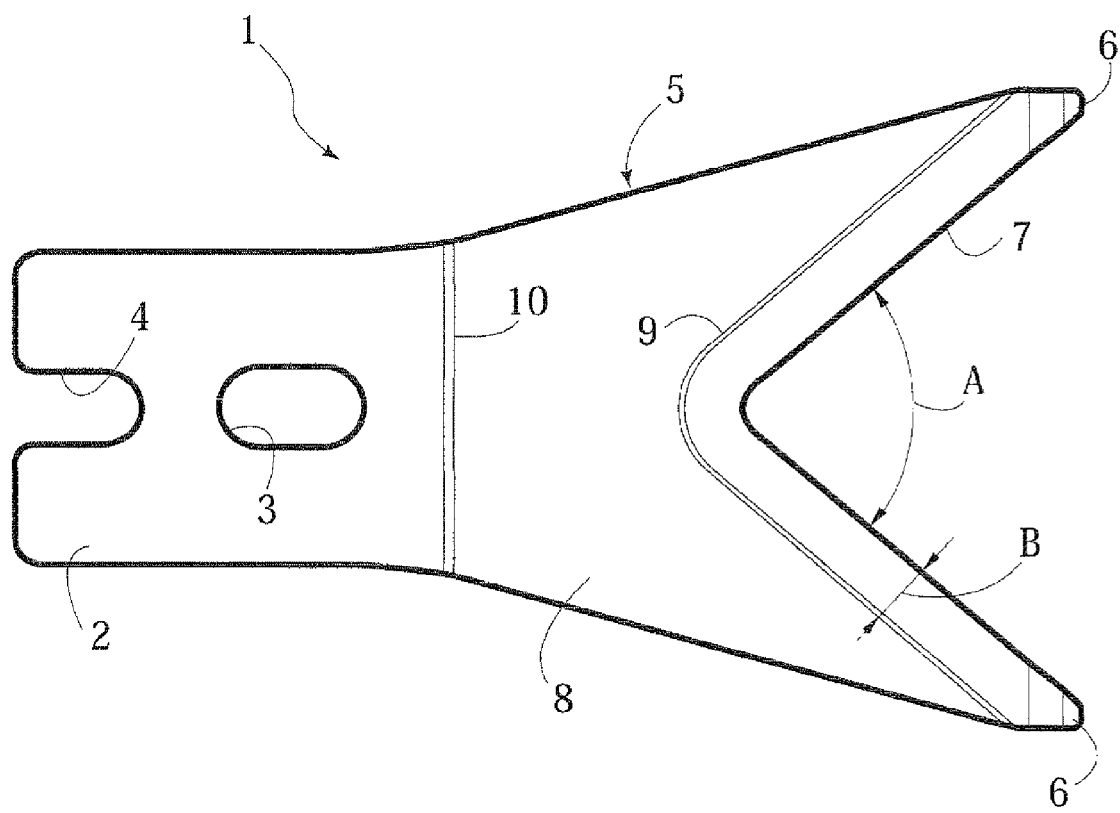
FIG. 3 is a top plan and large scale view of the blade.
Figure 4:
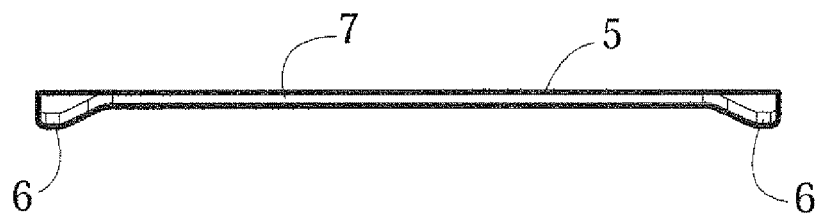
FIG. 4 is a front elevation view of the blade.

For example, should the distance between the ends 6 be in the order of about 90 mm, over the length of the entire blade itself in the order of about 150 mm, the width of the shearing edge 7, indicated with B in FIG. 3, shall be about 8 mm, while should the distance between the ends 6 be about 70 mm, over the total length of the knife 1 in the order of 130 mm., the width B of the shearing edge 7 shall amount to about 7 mm.

According to another fundamental aspect of the invention, between the shearing edge 7 and the rear support portion 2 of the knife 1, the upper surface of the latter has a lowered surface zone 8.

Figure 5:
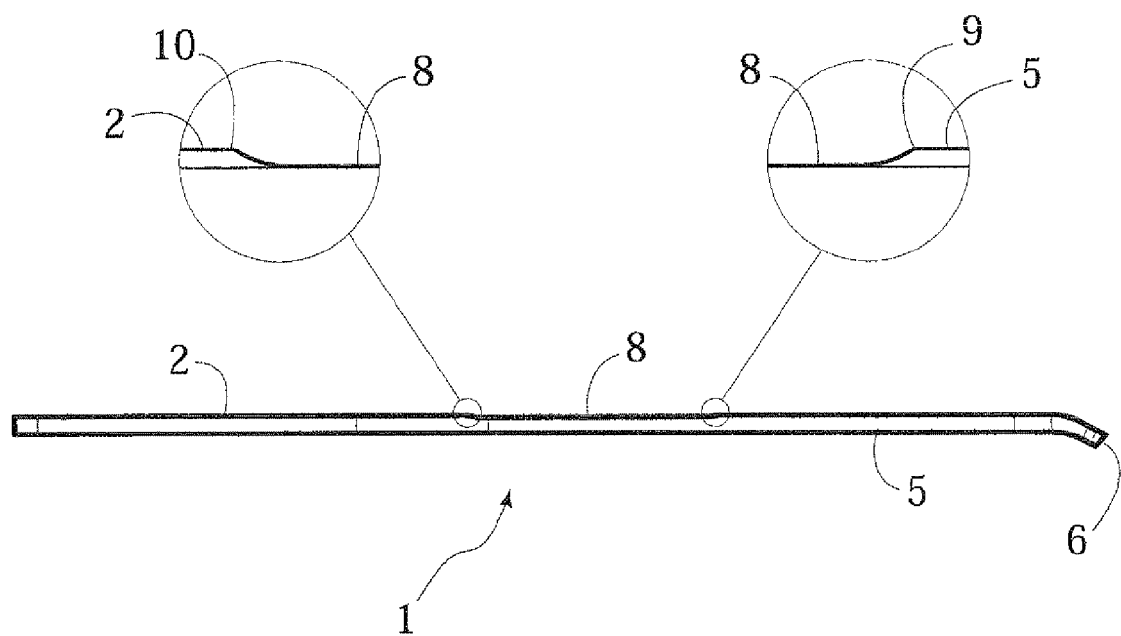
FIG. 5 is a side elevation view of the blade, with two enlarged details.

Such lowered zone 8, comprised between the rear margin 9 of the shearing edge 7 and the front margin 10 of the support portion 2, conveniently has a level difference in the range at least between 0.1 and 0.2 mm, preferably in the order of 0.15 mm with respect to such margins 9 and 10. As illustrated in detail in FIG. 5, the lowered surface 8 is joined on one side to the shearing edge 7 and to the support portion 2 on the other, through respective rounded bevels, for example with R2.

Due to the characteristics described above the blade according to the invention offers, with respect to conventional blades, two advantages: firstly, in use, such blade facilitates the sliding of the blade with respect to the homologous blade during the steps of shearing molten glass gobs, and secondly it allows improving the shearing quality and accuracy. Both factors contribute to remarkably extending the operative duration of the blade, which could last at least ten times more and beyond with respect to the duration of the conventional blades, thus attaining a significant reduction of the replacement times and thus, definitely, the manufacturing by-products of the molten glass.

Obviously, the construction details and the embodiments may widely vary with respect to the description and illustration provided above, without for this reason departing from the scope of the present invention as defined in the following claims.

What is claimed is:

1. A shearing blade for molten glass gobs comprising a generally flat knife made of hard metal having a first surface and a second surface opposite to said first surface, a rear support portion and a front substantially V-shaped shearing portion having a shearing edge, wherein said shearing edge has on said first surface a width which is greater than a corresponding opposite width on said second surface and is in the range between 8 and 11% of the distance between the ends of said V-shaped shearing portion, and wherein between said V-shaped shearing portion and said support portion said first surface of the knife has a lowered surface.

2. Blade according to claim 1, wherein said lowered surface has, with respect to a rear margin of said shearing edge, a difference level in the range at least between 0.1 and 0.2 mm.

3. Blade according to claim 1, wherein said lowered surface is joined to a rear margin of said shearing edge and to a front margin of said rear support portion through respective bevels.

4. Blade according to claim 1, wherein the distance between the ends of said V-shaped shearing portion is in the range between 70 and 90 mm and the width of said shearing edge is in the range between 6 and 9 mm.

5. Blade according to claim 1, wherein said V-shaped shearing portion has an angle in the order of 80°.

6. Blade according to claim 1, wherein said shearing edge is extended, on an upper surface of the knife, up to the height of said ends of said V-shaped shearing portion.

7. Blade according to claim 1, wherein said ends of said V-shaped shearing portion are bent downwards.

8. Blade according to claim 1, wherein said lowered surface has, with respect to a rear margin of said shearing edge, a difference level in the range at least between 0.1 and 0.15 mm.

9. Blade according to claim 1, wherein the distance between the ends of said V-shaped shearing portion is in the range between 70 and 90 mm and the width of said shearing edge is in the range between 7 and 8 mm.

10. A shearing blade for molten glass gobs comprising a generally flat knife made of hard metal having a first surface and a second surface opposite to said first surface, a rear support portion and a front substantially V-shaped shearing portion having a shearing edge, wherein said shearing edge has on said first surface a width which is greater than a corresponding opposite width on said second surface and is in the range between 8 and 11% of the distance between the ends of said V-shaped shearing portion, wherein between said V-shaped shearing portion and said support portion said first surface of the knife has a lowered surface, and wherein said ends of said V-shaped shearing portion are bent downwards.

11. Blade according to claim 10, wherein said lowered surface has, with respect to a rear margin of said shearing edge, a difference level in the range at least between 0.1 and 0.2 mm.

12. Blade according to claim 10, wherein said lowered surface is joined to a rear margin of said shearing edge and to a front margin of said rear support portion through respective bevels.

13. Blade according to claim 10, wherein the distance between the ends of said V-shaped shearing portion is in the range between 70 and 90 mm and the width of said shearing edge is in the range between 6 and 9 mm.

14. Blade according to claim 10, wherein said V-shaped shearing portion has an angle in the order of 80°.

15. Blade according to claim 10, wherein said shearing edge is extended, on an upper surface of the knife, up to the height of said ends of said V-shaped shearing portion.

16. Blade according to claim 10, wherein said lowered surface has, with respect to a rear margin of said shearing edge, a difference level in the range at least between 0.1 and 0.15 mm.

17. Blade according to claim 10, wherein the distance between the ends of said V-shaped shearing portion is in the range between 70 and 90 mm and the width of said shearing edge is in the range between 7 and 8 mm.

\* \* \* \* \*